US009665889B1

(12) United States Patent
Spencer et al.

(10) Patent No.: US 9,665,889 B1
(45) Date of Patent: *May 30, 2017

(54) SYSTEMS, METHODS AND ARTICLES FOR PROVIDING PERSONALIZED WEB CONTENT BASED ON PORTABLE PERSONAS

(71) Applicant: INTUIT INC., Mountain View, CA (US)

(72) Inventors: Carolyn Spencer, Webster, NY (US); Avanish Pathak, San Diego, CA (US); Vijoy Caro, Chula Vista, CA (US); Aliza D. Carpio, San Diego, CA (US); Alan Tifford, San Diego, CA (US); Ashley K. McMahon, San Diego, CA (US); Lisa B. Greene-Lewis, Ladera Ranch, CA (US)

(73) Assignee: INTUIT INC., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/965,770

(22) Filed: Dec. 10, 2015

Related U.S. Application Data

(63) Continuation of application No. 14/198,489, filed on Mar. 5, 2014, now Pat. No. 9,213,862.

(51) Int. Cl.
| | |
|---|---|
| *G06F 7/04* | (2006.01) |
| *G06Q 30/00* | (2012.01) |
| *G06Q 30/02* | (2012.01) |
| *H04L 29/08* | (2006.01) |
| *H04L 29/06* | (2006.01) |

(52) U.S. Cl.
CPC ......... *G06Q 30/0271* (2013.01); *H04L 63/08* (2013.01); *H04L 67/02* (2013.01); *H04L 67/42* (2013.01)

(58) Field of Classification Search
CPC ..... G06Q 30/0271; H04L 67/42; H04L 63/08; H04L 67/02
USPC ................................ 726/7; 705/14.49, 14.52
See application file for complete search history.

(56) References Cited

U.S. PATENT DOCUMENTS

| | | | |
|---|---|---|---|
| 9,213,862 | B1 * | 12/2015 | Spencer .............. G06F 21/6245 |
| 2010/0100950 | A1 | 4/2010 | Roberts |
| 2011/0264569 | A1 | 10/2011 | Houseworth et al. |
| 2012/0246139 | A1 | 9/2012 | Rao |
| 2013/0268395 | A1 | 10/2013 | Sandow |

(Continued)

*Primary Examiner* — Aravind Moorthy
(74) *Attorney, Agent, or Firm* — Vista IP Law Group LLP

(57) ABSTRACT

Systems, methods and articles of manufacture for delivering website content to an internet user which is personalized to the user based on a persona associated with the user. A persona database system accesses personal and financial data for the user from any suitable source, such as from a tax return of the user or personal finance management application or even a questionnaire. The persona database system matches the user's data to a persona for the user from a predetermined, discrete set of personas, wherein each persona identifies a generalized profile of personal and financial characteristics of the user. Then, when a user access a website hosted by a website server, the website server accesses the persona for the user from the persona database system and the website server personalizes the website content delivered to the user based on the persona for the user.

26 Claims, 6 Drawing Sheets

(56) References Cited

U.S. PATENT DOCUMENTS

| | | |
|---|---|---|
| 2013/0347023 A1 | 12/2013 | Brandwijk et al. |
| 2014/0090021 A1 | 3/2014 | Berkovitz et al. |
| 2014/0180817 A1 | 6/2014 | Zilkha |
| 2014/0279007 A1 | 9/2014 | Srinivasan et al. |
| 2014/0282919 A1 | 9/2014 | Mason |

* cited by examiner

SYSTEMS, METHODS AND ARTICLES FOR PROVIDING PERSONALIZED WEB CONTENT BASED ON PORTABLE PERSONAS

CROSS-REFERENCE TO RELATED APPLICATION

This Application is a continuation of U.S. patent application Ser. No. 14/198,489, filed Mar. 5, 2014, now U.S. Pat. No. 9,213,862, issued Dec. 15, 2015. Priority to the aforementioned application is hereby expressly claimed in accordance with 35 U.S.C. §120 and any other applicable statutes or laws. The contents of the aforementioned patent application is hereby incorporated herein by reference in its entirety for all purposes.

SUMMARY

Embodiments of the present invention are directed to systems, methods and articles of manufacture for delivering website content in a website which is personalized to the user accessing the website by utilizing a persona determined for the user from a predetermined, discrete set of personas based on personal and financial data of the user. Each of the personas identifies a different generalized profile of personal and financial characteristics of the user, such as family status, income level, vocation type (e.g. student, professional, manual labor, office worker, etc.), home owner or renter, etc.

One embodiment of the present invention is directed to a computer-implemented method for delivering personalized content in a website. Typically, the method is implemented on a website server comprising one or more computers, in which the computers include at least one computer processor, memory and software application(s) programmed to perform the steps of the method. The computer(s) of the website server are connected through one or more communication networks to the internet in order to deliver website content to a user via the internet, and also to access data from of other computer systems, as needed to implement the method. The website server includes website pages with website content and software programming for hosting the website (i.e. providing a website by delivering web pages to users accessing the website through the internet).

In this embodiment of the method, the website server system receives a request from an internet user for website content at a website. For example, the website may be a retail website which sells some products, such as shoes or clothing, for instance. The user may utilize a web browser or other application on any internet-connected computing device, including without limitation, a personal computer, a smartphone, a mobile phone, a tablet computer, or any other device having a processor, memory and an internet connection, to access the website hosted by the website server via the internet. The request for website content from the user may be generated by the user by any suitable means, such as entering a website address into the internet browser, clicking on a website link, using a search engine, or any other possible means by which a user can make a request for a website page, website resource or even upload to a web site.

Upon receiving the request for website content, the website server accesses a persona for the user (as used herein a "persona" also includes data representing the persona). The persona is a generalized profile of the personal and financial characteristics for the user. For example, several possible personas might be "cash strapped college student" (i.e. a person who is a student, aged 18-24, annual income less than $20,000, with limited income and money to spend, lives in a dorm or rented apartment); "middle aged, professional family man" (i.e. married man with children, professional career, income over $80,000, significant disposable income); etc. The possible personas which can be selected for users are predetermined from a discrete set of personas, with each possible persona identifying a different generalized profile of personal and financial characteristics. For instance, there may be 5 or 10 or 15 or 20 or more possible personas. As described in more detail below with respect to other embodiments, the persona for the user is selected based on personal and financial data of the user which is analyzed and determined based on the best match with the generalized profile of personal and financial characteristics of a persona within the set of possible personas.

Then, the website server transmits website content to the user which is personalized to the user based on the persona of the user. For example, if the persona for the user is "cash strapped college student," the website server determines the website content that should be directed to a user which has the generalized profile of personal and financial characteristics associated with the persona of a "cash strapped college student." Using the example of a retail website selling shoes, the website server might display to the user lower priced shoes, with styling that appeals to younger, college aged students.

In one aspect of the present invention, the website server may access the persona for the user from a third party, such as the operator of a persona database system. In this way, the persona for the user is portable to any website hosted by any website server, rather than being limited to a single website. For instance, the website server may access the persona for the user in response to the user selecting a command (e.g. a button) on a page of the website. Alternatively, or in addition, the website server may access the persona for the user in response to a command initiated by a browser plug-in installed in the user's internet browser or application. In response to the command, the website server simply makes a data call to the persona database system for the persona for the user, and the persona database system transmits the persona for the user to the website server. Accordingly, each website accessed by the user can access the user's persona to personalize the website content delivered to the user, creating a more customized, engaging and enjoyable experience for the user.

Another embodiment of the method for delivering personalized content is taken from the viewpoint of the persona database system which determines personas for users, and sends the personas to website servers in response to their requests. Similar to the website server above, the method is implemented on a persona database system comprising one or more computers, in which the computers include at least one computer processor, memory and software application(s) programmed to perform the steps of the method. The computer(s) of the persona database system are connected through one or more communication networks, such as the internet and/or other networks, to website servers, in order to receive requests for personas and to send personas for users in response. In the method, the persona database system accesses personal and financial data of the user. The persona database system may access the personal and financial data of the user from any suitable source, such as from available databases like tax return databases and/or personal finance management applications (such as QUICKEN financial management application, available from Intuit Inc., Mountain View, Calif., or MINT financial management application available at the website mint.com, or FINANCEWORKS financial management application provided by Intuit Financial Services, a unit of Intuit Inc., of Mountain View, Calif.), online social networking websites (such as FACEBOOK and TWITTER online social networking websites and the like), government records, etc. QUICKEN, MINT and FINANCEWORKS are registered trademarks of Intuit Inc., Mountain View, Calif. FACEBOOK is a registered trademark of Facebook, Inc., Menlo Park, Calif., and TWITTER is a registered trademark of Twitter, Inc., San Francisco, Calif. Alternatively, or in addition, the persona database system may access the personal and financial data of the user by using an online questionnaire having various questions requesting personal and financial data for the user and receiving responses from the user.

The persona database system analyzes the personal and financial data, and determines a persona that is most representative of the user based on the analysis of the data. The persona for the user is selected from a predetermined, discrete set of personas, as described above.

The persona database system then receives a first request for a user's persona in relation to a user accessing a first website hosted by a first website server, same or similar to the various aspects described above. The persona database system sends the persona for the user, which has been selected in the step described above, to the first website server.

In another aspect, as mentioned above, the persona is portable and can be easily utilized by multiple websites hosted by different website servers. Thus, in another aspect of this method, the persona database system receives a second request for the persona of the user in relation to the user accessing a second website, different from the first website and hosted by a second website server. In response, the persona database system sends the persona for the user to the second website server.

In another aspect of the present invention, a plurality of applicable personas may be determined and assigned to a user, and the user may be asked to select one or more of the personas to be sent to, and utilized by, a website server for personalizing the website content. Then, the persona website system can send the one or more personas to the website server in response to a request in relation to a user accessing a website. The website server may then send website content to the user which is personalized to the user based on the one or more personas for the user.

Another embodiment is directed to a system for delivering content in a website which is personalized to the user. The system comprises a website server including a computer having at least one processor, memory and software application(s). The computer(s) of the website server are connected through one or more communication networks to the internet in order to deliver website content to a user via the internet, and also to access data from of other computer systems, as needed to implement the method. The website server includes website pages with website content and software programming for hosting the website (i.e. providing a website by delivering web pages to users accessing the website through the internet). The website server is configured and programmed to perform a process according to any of the method embodiments of the present invention, including, for example, a process comprising: (i) receiving a request from a user for website content at a website; (ii) accessing a persona for the user which identifies a generalized profile of personal and financial characteristics for the user, the persona for the user determined based on personal and financial data of the user from a predetermined, discrete set of personas wherein each of the personas identifies a different generalized profile of personal and financial characteristics; and (iii) transmitting website content to the user wherein the website content is personalized to the user based on the persona for the user.

Still another embodiment of the present invention is directed to a system for delivering web site content which is personalized to the user from the viewpoint of the persona database system. The system comprises a persona database system having one or more computers, in which the computers include at least one computer processor, memory and software application(s) programmed to perform the steps of the method. The computer(s) of the persona database system are connected through one or more communication networks, such as the internet and/or other networks, to website servers. The persona database system is configured and programmed to perform a process according to any of the method embodiments of the present invention, including, for example, a process comprising: (i) receiving a request from a user for website content at a website; (ii) accessing a persona for the user which identifies a generalized profile of personal and financial characteristics for the user, the persona for the user determined based on personal and financial data of the user from a predetermined, discrete set of personas wherein each of the personas identifies a different generalized profile of personal and financial characteristics; and (iii) transmitting website content to the user wherein the website content is personalized to the user based on the persona for the user.

In another aspect of the persona database system, the process may comprise, or further comprise: (i) receiving a second request in relation to the user accessing a second web site, different from the first web site, for a persona for the user, the second web site hosted by a second web site server, the second web site requesting the persona in order to personalize website content to be delivered to the user; and; (ii) sending a second persona for the user to the second web site server.

Another embodiment of the present invention is directed to an article of manufacture comprising a non-transitory computer readable medium embodying instructions executable by a computer to execute a process according to any of the method embodiments of the present invention, including, for instance, a process comprising: (i) receiving a request from a user for website content at a website; (ii) accessing a persona for the user which identifies a generalized profile of personal and financial characteristics for the user, the persona for the user determined based on personal and financial data of the user from a predetermined, discrete set of personas wherein each of the personas identifies a different generalized profile of personal and financial characteristics; and (iii) transmitting website content to the user wherein the website content is personalized to the user based on the persona for the user.

Another embodiment of the present invention is directed to an article of manufacture comprising a non-transitory computer readable medium embodying instructions executable by a computer to execute a process according to any of the method embodiments of the present invention, including, for instance, a process comprising: (i) receiving a request from a user for website content at a website; (ii) accessing a persona for the user which identifies a generalized profile of personal and financial characteristics for the user, the persona for the user determined based on personal and financial data of the user from a predetermined, discrete set of personas wherein each of the personas identifies a different generalized profile of personal and financial characteristics; and (iii) transmitting website content to the user wherein the website content is personalized to the user based on the persona for the user.

Another embodiment of the present invention is directed to another article of manufacture comprising a non-transitory computer readable medium embodying instructions executable by a computer to execute a process according to any of the method embodiments of the present invention, including, for instance, a process comprising: (i) receiving a request from a user for website content at a website; (ii) accessing a persona for the user which identifies a generalized profile of personal and financial characteristics for the user, the persona for the user determined based on personal and financial data of the user from a predetermined, discrete set of personas wherein each of the personas identifies a different generalized profile of personal and financial characteristics; and (iii) transmitting website content to the user wherein the website content is personalized to the user based on the persona for the user.

In another aspect of the computer readable medium, the process may comprise, or further comprise: (i) receiving a second request in relation to the user accessing a second web site, different from the first web site, for a persona for the user, the second web site hosted by a second web site server, the second web site requesting the persona in order to personalize website content to be delivered to the user; and; (ii) sending a second persona for the user to the second website server.

It is understood that the steps of the methods and processes of the present invention are not required to be performed in the order as shown in the figures or as described, but can be performed in any order that accomplishes the intended purpose of the methods and processes.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant.

DETAILED DESCRIPTION OF ILLUSTRATED EMBODIMENTS

Embodiments of the present invention are directed to computerized systems, methods and articles of manufacture for delivering website content to an internet user which is personalized to the user based on a persona associated with the user from a predetermined, discrete set of possible personas based on personal and financial data of the user. Each persona identifies a generalized profile of personal and financial characteristics of the user, which a website can utilize to target website content that will be relevant, interesting, pertinent and/or engaging to the user. There are numerous websites on the internet, and when a user first enters a website, the user and the website may be completely anonymous to each other. The user may not know what the website can offer that would be of interest to the user, and the website does not know who the user is and what type of website content, such as information, tools, products, and service the user wants. This can be a significant problem to websites as user may spend only an average of 4-5 seconds at a website before deciding whether to leave or stay at the website. As an example, a user accessing a fashion website or blog to learn more about a fashion topic or shop for specific items will not be completely engaged by generic and static content presented to the user. The user would prefer to read articles and use services that align with the user's interests. However, the website does not know anything about the user, so the website cannot personalize the website content delivered to the user. The present invention allows the website to personalize the website content transmitted to the user based on a persona selected for the user which is associated with a generalized profile of personal and financial characteristics.

In summary of the present invention, a persona database system accesses personal and financial data for the user from any suitable source, such as from a tax return of the user or personal finance management application or even a questionnaire. The persona database system analyzes the data and determines a persona for the user from a predetermined, discrete set of personas. Each of the personas identifies a different generalized profile of personal and financial characteristics, such as a "cash-strapped student," a "professional, middle-aged male head of household," a "housewife in a wealthy household," etc. Then, when a user access a website hosted by a website server, the website server accesses the persona for the user from the persona database system. The persona database system receives the request from the website server and provides the persona (e.g. data representing the persona) to the website server. The website server then personalizes the website content delivered to the user based on the persona for the user.

Figure 1:
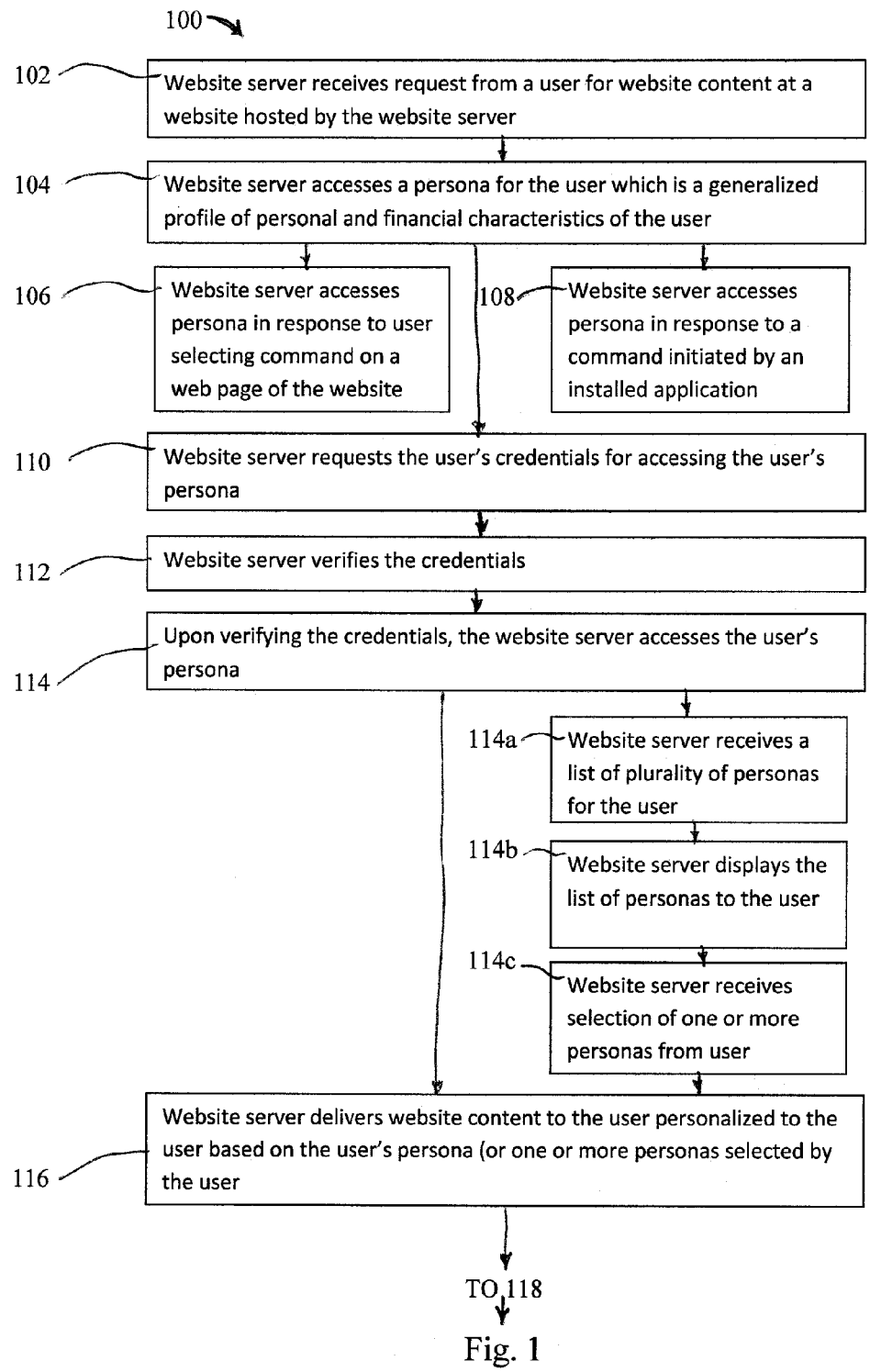
FIG. 1 is a flow chart of a computer-implemented method for delivering personalized website content in a website, according to one embodiment of the present invention.
Figure 1:
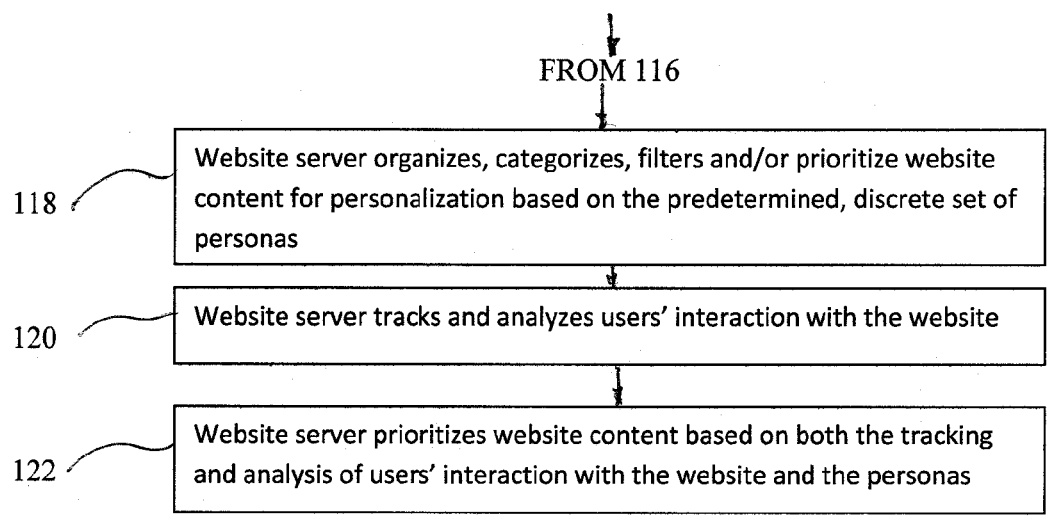

Referring now to FIG. 1, in one embodiment, a flow chart for a computer-implemented method 100 for delivering personalized website content in a website is shown. The computerized method 100 is implemented on a system including a website server, as described above, which is configured to perform the method 100, such as system 300 shown in FIG. 4, and described in more detail below. At step 102 of the method 100, the website server receives a request from a user for website content at a website hosted by the website server. The request for website content take any suitable form, such as entering a website address into an internet browser, clicking on a website link, searching with an internet search engine and clicking on a search result, or any other ways of requesting a website page, website resource, tool or service, or upload to the website.

At step 104, after receiving the request for website content at step 102, the website server accesses a persona for the user which has been previously assigned to the user based on personal and financial data of the user. As discussed above, the persona is a generalized profile of personal and financial characteristics for the user which is selected from a predetermined, discrete set of personas, wherein each persona is associated with a different generalized profile of personal and financial characteristics, such as age, income level, family status, vocation type (e.g. student, professional, manual labor, office worker, entrepreneur, business owner, executive, etc.), avocations and hobbies, residence type (homeowner, renter, etc.), credit usage (credit card debt level, loans, etc.), shopping habits (frequent shopper, frugal, bargain hunter, luxury goods consumer, etc.), financial savings habits (saver, non-saver), etc. The following is a non-limiting list of examples of personas, and the generalized profile that may be associated with each persona:

"Cash strapped college student"—aged 18-24; single/unmarried; low disposable income (e.g. less than $20,000 annual income); rents apartment or lives in dormitory; spendthrift; little or no credit debt.

"Middle-aged, professional family man"—aged 30-50; married with children; professional career, significant annual income (e.g. over $80,000); some savings (e.g. over $10,000); homeowner with mortgage or renter; types of avocations and hobbies (sports enthusiast, extreme sports participant, leisure reader, regular exercise, video gamer, etc.).

"Young splurger"—age 22-30; single or married without children; employed earning significant annual income (e.g. over $40,000); high credit card debt (e.g. over $2000); homeowner with mortgage or renter; types of avocations and hobbies (sports enthusiast, extreme sports participant, leisure reader, regular exercise, video gamer, etc.).

"Young saver"—age 22-30; single or married without children; employed earning significant annual income (e.g. over $40,000); little or no credit card debt (e.g. less than $500); homeowner with mortgage or renter; types of avocations and hobbies (sports enthusiast, extreme sports participant, leisure reader, regular exercise, video gamer, etc.).

"Entrepreneur"—age 22-50; marital status (e.g. married, single, any children); area of entrepreneurship (e.g. technology, finance, small business, services, retail, wholesale, etc.); annual income (e.g. over $80,000); some savings (e.g. over $10,000); homeowner with mortgage or renter; types of avocations and hobbies (sports enthusiast, extreme sports participant, leisure reader, regular exercise, video gamer, etc.).

Each of these personas may be further defined in additional personas based on the personal and financial characteristics. For instance, the "Entrepreneur" persona may be expanded into a number of different personas depending on any of the various characteristics, such as "Entrepreneur, single, low income, renter", "Entrepreneur, married, high income, homeowner" Entrepreneur, single, low income, homeowner" "Entrepreneur, single, high income, extreme sports participant"; and various other combinations of the personal and financial characteristics. Still, as explained above, there are only a discrete set of personas, and not a different profile for every possible user. In this way, the present invention allows selection of a generalized profile for the user which allows website content to be personalized based on certain known characteristics of the user, while at the same time maintaining a high level of privacy of the user's specific personal and financial data.

Methods for determining the persona of the user based on personal and financial data of the user are described in detail below with respect to method 200, which methods are equally applicable to the determination of a user's persona as related to method 100.

The website server may access the persona for the user by various methods. In one aspect, at step 106, the website server accesses the persona for the user in response to the user selecting a command on a web page of the website being accessed by the user. For example, the web page may be programmed with a button, a menu selection, or other command which the user can select (e.g. clicking on the button or menu selection) in order to instruct the website to access the user's persona. The selection may also provide the user's consent or permission for the website server to access the user's persona. Step 106 requires that the command for accessing the user's persona be programmed into each website having the personalization feature of the present invention, such as method 100.

Alternatively, at step 108, the website server accesses the persona for the user in response to a command initiated by an application installed on the user's computing device, such as a browser plug-in installed in the user's internet browser.

In another aspect, as described above and in more detail below, the website server may access the persona for the user from a persona database system operated by a persona database provider. For instance, the persona database system may transmit the persona to the website server which receives the persona.

In order to provide a level of security for accessing the user's persona, the method 100 may include steps to verify/authenticate the user in order to allow the website server to access the user's persona. At step 110, in response to the command at either step 106 or 108, the website server requests the user's credentials for accessing the user's persona. As an example, the website server may display form fields on a web page or a popup to the user for the user to fill-in the user's credentials for accessing the user's persona, such as a username and password. The credentials may be the credentials for the user's account at the persona database system, or other linked account of the user. The user inputs the credentials at the user's computing device, and transmits the credentials to the website server which receives the credentials. At step 112, the website server verifies the credentials. The website server may verify the credentials by any suitable method, such as transmitting the credentials to the persona database system or verifying the credentials via the website server's own credential verification database. At step 114, upon verifying the credentials, the website server accesses the user's persona. As described above, the website server may access the user's persona by requesting and receiving it from a persona database system, or by any other suitable means of accessing the user's persona.

A non-limiting example of an algorithm for implementing steps 104-114 is as follows:

Website Server Side:
<!-- EMBED CODE -->
<div><a target="_blank" class="button">Personalize with Intuit Personas</a></div>
Clicking link will open a popup, asking for credentials for accessing user's persona.
Persona Database System Side:
public static JSONObject returnListIfAuth( ){
  if (Authenticate(request.Username, request.Password))
  {
    JSONObject personas=new JSONObject( );
    SQL STATEMENT to get List of Personas for authenticated User for (each persona){
personas.put("name","value");
}
  return list of personas and basic details}
return null
}
If the user is verified/authenticated, query database for the list of one or more personas matching the user ID of the authenticated user. Return a json object containing the list of one or more personas that were matched to the user using the methods described below.

At step 116, the website server transmits website content to the user which is personalized to the user based on the user's persona. As an example, if the user's persona is a "cash strapped college student," the website server delivers website content to the user which is expected to be relevant, interesting, and/or engaging to a person having the generalized personal and financial profile associated with the persona of a "cash strapped college student."

In another optional aspect of the method 100, at step 114, the website server may access multiple personas for the user, and may also receive a selection from the user of one or more of the personas for the user with which to personalize the website data delivered to the user. In this situation, a plurality of personas have been determined and matched to the user's personal and financial data such that the user fits more than the generalized profiles of more than one respective persona. Accordingly, at step 114a, the web site server receives a list of a plurality of personas for the user. At step 114b, the website server displays the list of personas to the user. At step 114c, the user selects one or more of the personas to be used to personalize the web site content, and the website server receives the selection from the user. Then, at step 116, the website servers delivers website content to the user which is personalized to the user based on the one or more personas selected by the user.

In another optional aspect of the present invention, at step 118, the website server may organize, categorize, and/or filter its website content for personalization based on the predetermined, discrete set of personas. In other words, the website server determines what website content should be prioritized for delivery to each of the personas within the discrete set of personas. For example, for each of the five example personas described above, the website server will analyze its content and the characteristics of each of the personas, and determine what website content is most relevant, interesting and/or engaging to each of the personas having their respective generalized profiles of personal and financial characteristics. Step 118 may be performed at any place relative to the steps of the method 100, such as prior to step 102 (receiving a request for website content), or after step 114 (accessing the user's persona), or before or after any of the other steps.

At step 120, in another optional aspect of the method 100, the website server may also track and analyze users' (which may include the user and other users) interaction a website, including for example, the web pages visited, the users' interaction with the web pages, time spent at the web pages, and the users' response to content displayed. At step 122, the website server utilizes this tracking and analysis of users' interaction with the web site to personalize the website content delivered to the user, in addition to using the persona for the user. For instance, the website server may identify certain website content which is frequently accessed by users having a certain persona, and then prioritize (e.g. display more often, or recommend more often) such website content to be displayed to user's having such persona. Similarly, website content which is least of interest to users having a certain persona may be given lower or no priority for display to users having such persona. The website content which is prioritized based on steps 120 and 122 may also be used to identify other website content which is similar to, or accessed commonly with, the prioritized website content. The similar and related website content can then also be prioritized for display to users having a certain persona. The website server can update, replace, and/or re-prioritize the website content prioritized at step 118 (based on the personas) with the website content prioritized according to steps 120 and 122 (based on the tracking and analysis of website interaction). A non-limiting example of an algorithm for displaying website content which is personalized/prioritized based on both a persona for the user and the tracking and analysis of user interaction with the website, applied to a blog website in which the website content comprises blog articles and tools (it should be understood that the algorithm can be applied to any type of website and website content by modification by one of ordinary skill in the art), is as follows:

```
}
getArticlesAndTools(persona){
    Get list of links to Articles from Database
    Get list of tools which are recommended for the per-
       sona.
    return Articles, Tools
}//function will return a list of articles and tools based on
    the persona
//if the persona is student, few important articles and
    recommended tools to help monitor
//expenses, such as SnapTax can be recommended.
Present the Articles and Tools to the User.
onClick(link)
{
    weightage['link']++;
}
//Check if the link is clicked and increase the weightage
    of the link to assign it a higher priority. Recommend
    highest weighted links first. Pull more articles from the
    category of the Highest Weighted Links, and replace
    the lower weightage links.
```

It should be understood that the algorithm can be applied to any type of website and website content by modification by one of ordinary skill in the art, including the website described below.

In general, the website may be any type of website, such as a blog website, a promotional website, a company website, a retail website, a blog website, etc. Still, in a further aspect of the present invention, the website is a blog website and the website content comprises one or more articles and entries. For a blog website, the method 100 may personalize the website content to display certain articles and entries based on the persona and/or tracking and analysis of user interaction. In another aspect, the website is a retail or commercial website selling products or services, and the website content comprises products or services being sold on the website. For a retail or commercial website selling products or services, the method 100 may personalize the website content to display certain products or services sold on the website based on the persona and/or tracking and analysis of user interaction.

Figure 2:
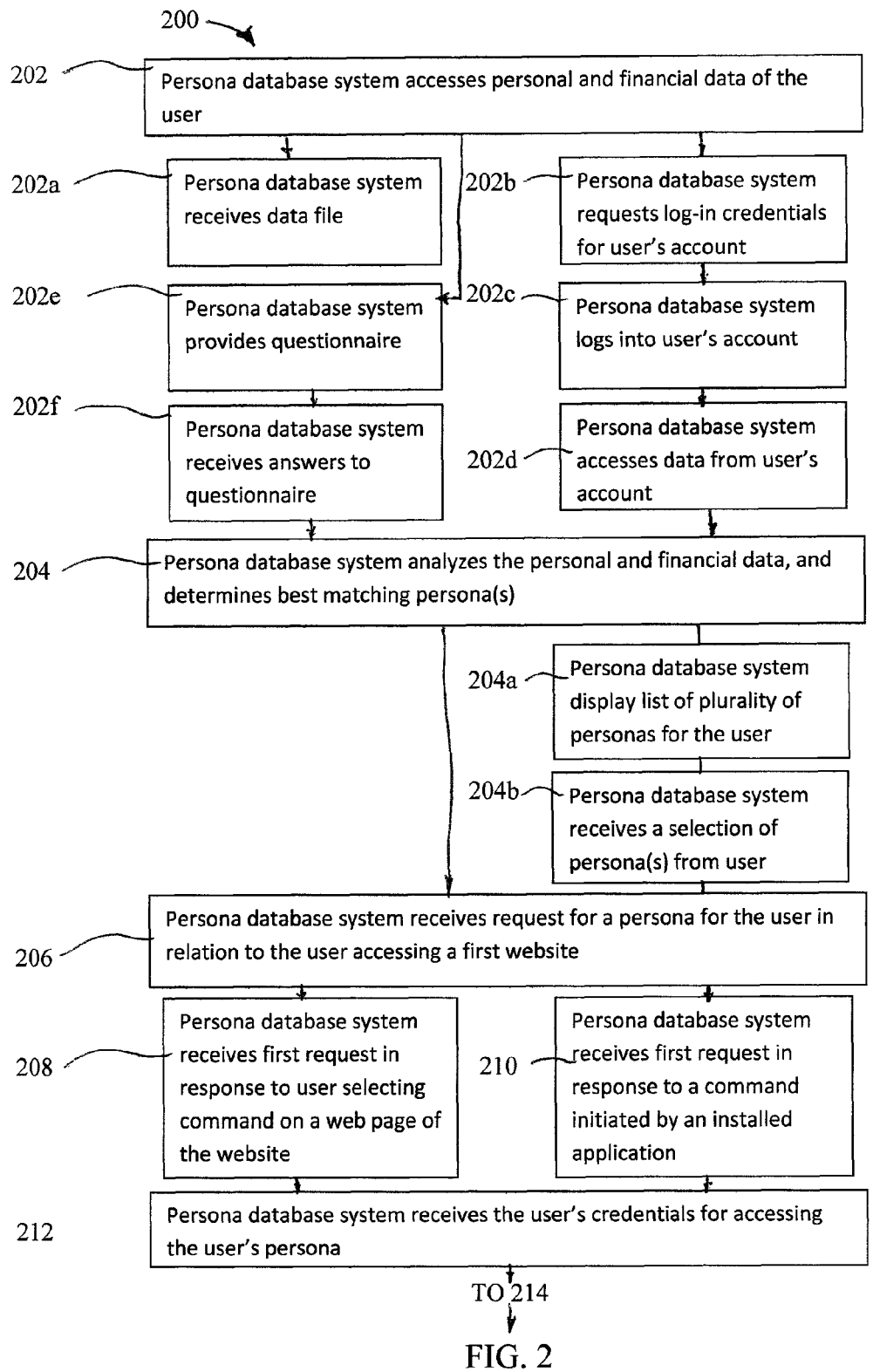
FIG. 2 is a flow chart of a computer-implemented method for delivering personalized website content in a website, according to another embodiment of the present invention.
Figure 2:
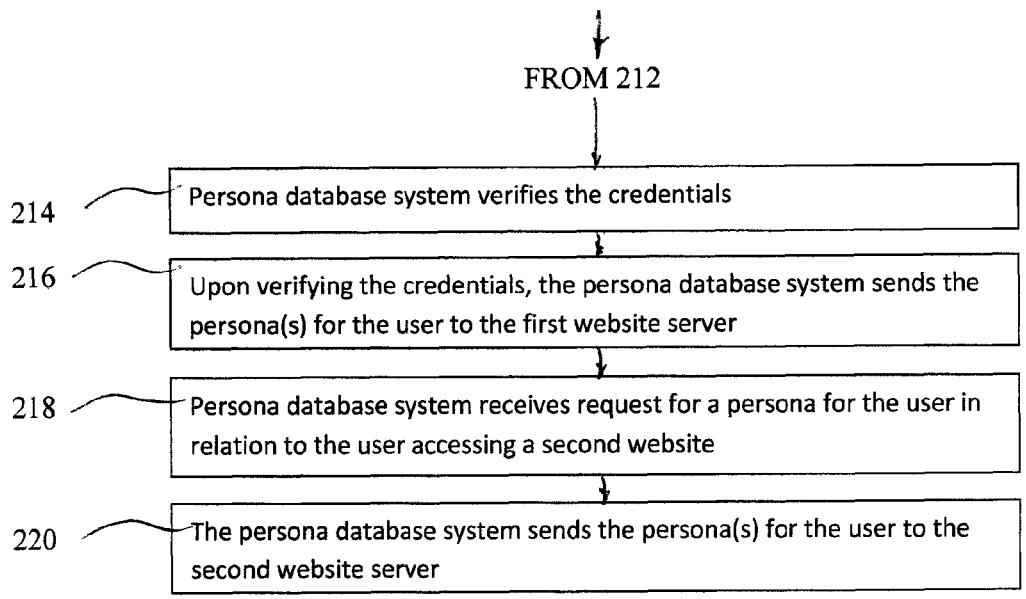

Turning now to FIG. 2, another embodiment of a method 200 for delivering website content in a website personalized to a user is shown, from the perspective of a persona database system which determines persona(s) for a user based on personal and financial data of the user. The method 200 is implemented on a system including a persona database system, having one or more processor, memory and software, which is configured to perform the method 200, such as system 300 shown in FIG. 3, and described in more detail below.

At step 202, the persona database system accesses personal and financial data of the user. The persona database system accesses the personal and financial data from any suitable source, such as from available databases and/or by receiving responses from the user to a questionnaire. As some examples, the persona database system may access personal and financial data for the user by electronically accessing databases such as tax return data files and/or databases of electronic tax return applications like TURBOTAX®, available from Intuit Inc., Mountain View, Calif., and/or data files and/or databases from personal finance management databases application (such as QUICKEN®, available from Intuit Inc., Mountain View, Calif., or MINT®, an online application available at the website MINT.COM, or FINANCEWORKS™ provided by Intuit Financial Services, a unit of Intuit Inc., of Mountain View, Calif.), social networking websites (such as FACEBOOK™, TWITTER™, LINKEDIN™ and the like), government records (e.g. property tax records, county records, insurance records, other publicly available databases of personal and financial data, etc. At step 202*a*, the persona database system receives a data file of personal and financial data of the user. For example, the user can provide access to the personal and financial data by sending a data file to the persona database system. In addition, the user can facilitate access to the data by the persona database system by providing the user's log-in credentials for accessing the data. For instance, the user may provide the persona database system with the user's log-in credentials for TURBOTAX. The persona database system may then log-in to TURBOTAX and access the user's tax return data, which includes personal and financial data of the user, such as age (birthdate), income, profession, marital status, dependents (e.g. children), mortgage information (homeownership), renter's credit information, etc. Thus, at step 202*b*, the persona database system requests log-in credentials from the user for accessing a user's account at a database having personal and financial data of the user. At step 202*c*, the persona database system logs into the user's account. At step 202*d*, the persona database system accesses personal and financial data of the user from the database of the user's account.

Alternatively, or in addition to accessing data from data files and databases, the persona database system may access the personal and financial data of the user by using an online questionnaire having various questions requesting personal and financial data for the user and receiving responses from the user. As an example, the data accessed from data files and database may be incomplete or need supplementation, in which case, at step 202*e* the persona database system provides a questionnaire to the user, and a step 202*f*, the user inputs answers which are received by the persona database system. The questionnaire may be in any suitable form, such as fillable field form, a series of interview questions, a plurality of menus and/or selections, etc. The questionnaire may ask for the user's age, income, vocation, marital status, homeownership, renter status, educational background, avocations and hobbies, etc.

Optionally, the persona database system may then compile and organize the accessed personal and financial data of user.

At step 204, the persona database system analyzes the personal and financial data, and determines a persona, or a plurality of personas, having a generalized profile of personal and financial characteristics which best matches the personal and financial data of the user. The personas are selected from a predetermined, discrete set of personas wherein each of the personas identifies a different generalized profile of personal and financial characteristics, as described above. The various personas and their respective generalized profile of personal and financial characteristics may be created by a system administrator for the provider of the persona database system, and/or by the system analyzing a significant database of personal and financial data of numerous users and analytically creating the various personas based on parsing the data and analyzing and categorizing based on keywords, patterns, relationships and/or trends in the data.

The persona database system may analyze and determine the persona(s) for the user by any suitable method. In one way, the persona database system may utilize an algorithm to match the personal and financial data of the user to the generalized profile of personal and financial characteristics of the personas. The algorithm may utilize various factors, including keyword matching based on semantic equivalence of words from the user's data (source) to the persona characteristics (target). While defining or creating the personas each having a respective generalized profile at the back end, the provider of the persona database system would need to define the name of each persona, tag words associated with each persona (needed for matching, high weightage for matching), links to website content that should be prioritized for each persona (needed for matching, low weightage for matching) and a few products related to website content that should be prioritized for each persona. The persona that most matches the user's profile will have the highest weightage or would be most relevant for the user. A non-limiting example of an algorithm for implementing steps 202-204 is as follows:

```
if(logged_in)
{
    data=getDataFromDatabase(username,password);
}
else
{
    data=$_POST['quiz data'];
}
//Get Data from Database based on your database credentials, if you choose to login.
//else answer the quiz and save the response of the quiz in variable data.
matchProfileToPersona(data)
{
data compared to various pre-defined Personas.
Switch (data)
{
    case Cash_Strapped_Student: if(income <$$ && isStudent==YES)
    case Rich_Student: if(income >$$ && isStudent==YES).
    .
    .
}
The persona which has the highest match to the input data, is selected.
return persona
}
//function will return the best matched Persona(s)
```

In the case of determining a plurality of personas, optional steps 204*a*-204*b* may be performed to allow the user to select one or more of the determined personas to be used by the system in personalizing website content to be delivered to the user. At step 204*a*, the persona database system displays a list of a plurality of personas determined for the user at step 204. At step 204*b*, the persona database system receives a selection of one or more of the displayed personas from the user.

The persona database system repeats the steps 202-204 (which may include the optional steps) for a plurality of user in order to create a database of persona records wherein each persona record includes a user and the user's respective persona(s).

At step 206, the persona database system receives a first request for a persona for a user in relation to a user accessing a first website, wherein the first website is requesting the persona in order to personalize website content to be delivered to the user. As described above, the first web site is hosted by a first web site server, and the web site server may send a request to the persona database system by various methods to the persona database system to access the persona(s) for the user. Similar to step 106 described above, at step 208, the persona database system may receive the first request for a persona in response to the user selecting a command on the first website. Alternatively, at step 210, the persona database system may receive the first request for a persona from a command initiated by an application installed on the user's computing device, such as a browser plug-in within the user's internet browser.

At step 212, the persona database system receives credentials of the user for permitting access to the persona of the user, same or similar to step 110 described above, except from the perspective of the persona database system instead of the website server. Thus, the persona database system may receive the credentials of the user from the website server, or directly from the user's computing device. At step 214, the persona database system verifies the credentials of the user.

At step 216, upon verifying the credentials, the persona database system sends the persona for the user to the first website server. As described above with respect to method 100, the first website server may then deliver website content for the first website which is personalized to the user based on the user's persona(s) and/or based upon the tracking and analysis of interaction with the first website.

The method 200 may be finished at step 216, or may continue in a way that demonstrates the portability of the use of persona(s) according to the present invention. For instance, at step 218, the persona database system receives a second request for a persona of the user in relation to the user accessing a second website, hosted by a second website server, different from the first website and first website server. The persona database system may receive the request according to step 208 and/or 210, and may also perform the steps 212-214 for receiving and verifying the user's credentials for accessing the user's persona. Alternatively, user's credentials have already been verified with respect to accessing the user's persona for the first website, the credentials may not be verified again, for example if the persona is being accessed during the same internet browsing session from the same computing device. For the sake of brevity, these steps are not repeated here or in the flow chart of FIG. 2.

Then, at step 220, the persona database system sends the persona(s) for the user to the second website server. Again, as described above with respect to method 100, the second website server may then deliver website content for the second website which is personalized to the user based on the user's persona(s) and/or based upon the tracking and analysis of interaction with the second website.

Figure 3:
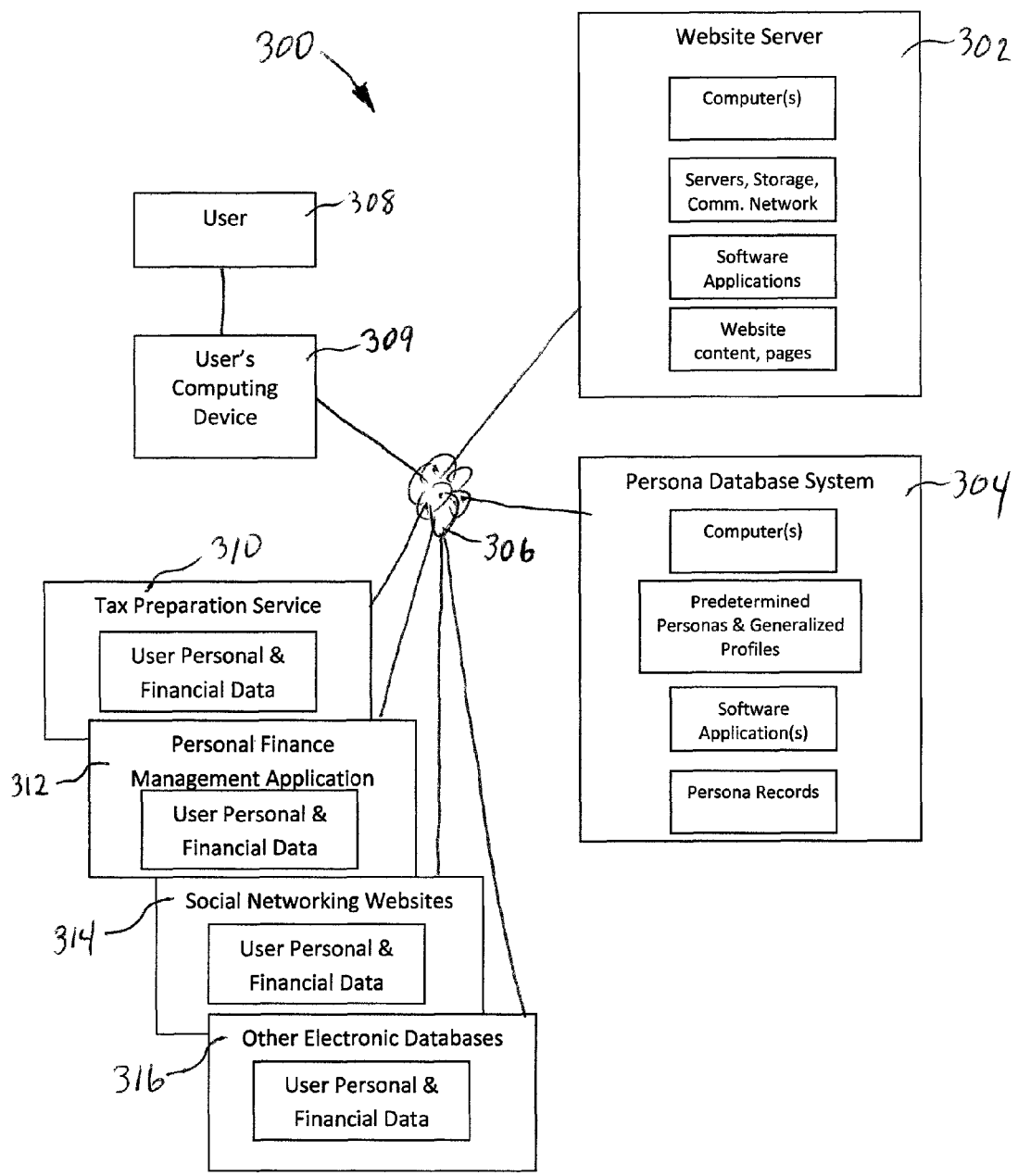
FIG. 3 illustrates a system for delivering personalized website content in a website, according to still another embodiment of the present invention.

Referring now to FIG. 3, a non-limiting example of a computerized system 300 that may be used to implement the methods 100 and 200 shown in FIGS. 1 and 2, as well as any other method embodiments described herein, is shown. It should be understood that not all of the subsystems and components of the system 300 are needed to implement the methods 100 and 200, and therefore, the system may include only those subsystems and components necessary to perform the method embodiments as described herein. For example, as described above, the system may include just the website server 302 or just the persona database system 304, or any other suitable combination of the web site server 302, persona database system 304, and/or other subsystems and components.

The system 300 comprises a website server 302 having one or more computers each having at least one processor, memory and software application(s). The computer(s) of the website server 302 are connected through one or more communication networks 306 to the internet in order to deliver website content to a user via the internet, and also to access data from of other computer systems, as needed to implement the method. The one or more communication networks 306 may include may include a proprietary network, LAN, WAN, cellular network, wireless network, the internet and/or other suitable network or any combination thereof. The website server 302 includes website pages with website content and software programming for hosting the website (i.e. providing a website by delivering web pages to users accessing the web site through the internet). The web site server is configured and programmed to perform a process according to any of the method embodiments of the present invention, including the methods 100 and 200, described herein.

The website server 302 is in operable communication with the persona database system 304 through the one or more communication networks 306. The persona database system 304 comprises one or more computers, in which the computers include at least one computer processor, memory and software application(s) programmed to perform the steps of any of the methods 100 and 200, or other described embodiments. The computer(s) of the persona database system are in electronic communication with one or more website servers 302 through the one or more communication networks 306. The persona database system includes the predetermined personas and their respective generalized profiles, software application(s) and persona records each associating a user with the user's respective persona(s) The persona database system can electronically access personal and financial data through the one or more communications networks 306 from any available electronic database, including a tax preparation service provider 310, a personal finance management application provider 312, various social networking websites 314, as well as any other available electronic databases 316. The persona database system is configured and programmed to perform a process according to methods 100 and 200, or any of the other method embodiments described herein.

The user 308 accesses and utilizes the website server 302 and/or persona database system 304 through a computing device 309 (as described above, any computing device having a processor and capable of a network connection) connected to the internet 306 and/or other communication networks 306.

Figure 4:
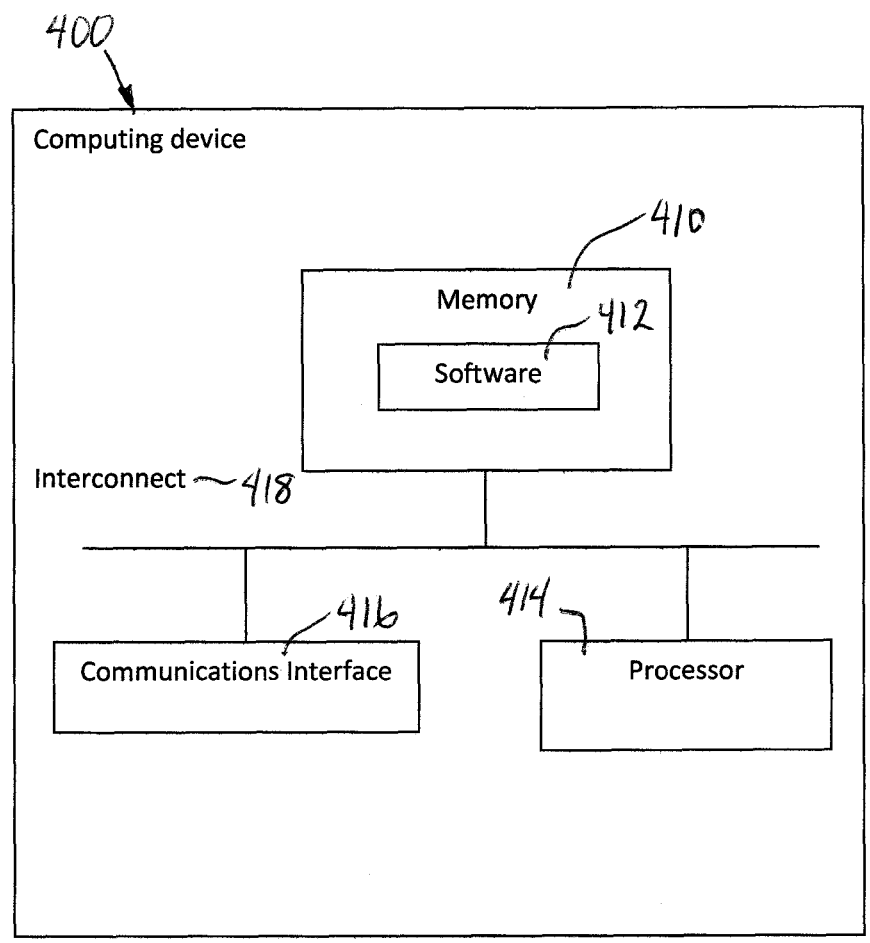
FIG. 4 is a block diagram of a computing device (computer) which may be utilized in any of the embodiments of the present invention, including the system of FIG. 3.

FIG. 4 generally shows a block diagram of the components of an example of a computer (computing device) 400 that may be used as the computer in the computers and servers identified in the system 300 of FIG. 3, such as the user computer 309, the website server 302, and the persona database system 30304. The computer 400 includes a memory 410, a tax preparation application software 412, a processor or controller 414 to execute the application software 412, a network or communications interface 416, e.g., for communications with a network or interconnect 418 between the components. The memory 410 may be or include one or more of cache, RAM, ROM, SRAM, DRAM, RDRAM, EEPROM, SDRAM and other types of volatile or non-volatile memory capable of storing data. The processor unit 414 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 418 may include a system bus, LDT, PCI, ISA, or other types of buses, and the communications or network interface may, for example, be an Ethernet interface, a Frame Relay interface, or other interface. The network interface 416 may be configured to enable a system component to communicate with other system components across a network which may be a wireless or various other networks. It should be noted that one or more components of computing device 400 may be located remotely and accessed via a network. Accordingly, the system configuration provided in FIG. 12 is provided to generally illustrate how embodiments may be configured and implemented.

The methods 100 and 200 shown in FIGS. 1 and 2, as well as other method embodiments described herein, may also be embodied in, or readable from, a computer-readable medium (computer program carrier), e.g., one or more of the fixed and/or removable data storage data devices and/or data communications devices connected to a computer, including a non-transitory computer medium having instructions that when executed by a computer perform a the described methods. The computer program carrier is readable by a computer and embodies instructions executable by the computer to perform the method steps of programming a computer to perform the methods 100 and 200, or any other method embodiments described herein. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, and DVD-RW.

Although particular embodiments have been shown and described, it is to be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. Accordingly, embodiments are intended to exemplify alternatives, modifications, and equivalents that may fall within the scope of the claims.

What is claimed is:

1. A system for delivering personalized content in a website, comprising:
 a persona database system, the persona database system comprising a computer having at least one processor, the persona database system being configured and programmed to perform a process comprising:
 accessing personal and financial data of a user;
 comparing the personal and financial data of the user with a predetermined, discrete set of personas wherein each persona identifies a different generalized profile of personal and financial characteristics associated with each respective persona, and determining a matching persona from the predetermined, discrete set of personas which has a generalized profile of personal and financial characteristics which best matches the personal and financial data of the user;
 receiving a first request in relation to the user accessing a first website for a persona for the user, the first website hosted by a first website server, the first website requesting the persona in order to personalize website content to be delivered to the user; and
 sending the matching persona to the first website server.

2. The system of claim 1, wherein the process further comprises:
 the persona database system receiving a second request in relation to the user accessing a second website, different from the first website, for a persona for the user, the second website hosted by a second website server, the second website requesting the persona in order to personalize website content to be delivered to the user; and
 the persona database system sending the matching persona to the second website server.

3. The system of claim 2, wherein the second website server is one of the same website server as the first website server or a different website server as the first website server.

4. The system of claim 1, wherein the persona database system accesses the personal and financial data of the user from a computerized tax return application.

5. The system of claim 1, wherein the persona database system accesses the personal and financial data of the user by providing an online questionnaire to the user and receiving responses to the online questionnaire from the user.

6. The system of claim 1, wherein the process further comprises:
 the persona database system receiving credentials of the user from the first website server for accessing the matching persona of the user;
 the persona database system verifying the credentials of the user; and
 upon verifying the credentials, the persona database system executing the step of sending the matching persona to the first website server.

7. The system of claim 1, wherein the persona database system receives the first request in relation to the user accessing the first website for a persona in response to the user selecting a command on the first website.

8. The system of claim 1, wherein the persona database system receives the first request in relation to the user accessing the first website for a persona from a browser plug-in installed in the user's internet browser.

9. The system of claim 1, wherein the first website is operated by a third party that is not the user or a provider of the persona database system.

10. The system of claim 1, wherein in the first website is a blog website and the website content comprises one or more articles distributed by the blog website.

11. The system of claim 1, wherein the first website is a commercial website selling products or services, and the first website content is personalized to the user to display certain products or services sold on the first website based on the matching persona for the user.

12. The system of claim 1, wherein the persona database system utilizes a matching algorithm to determine a matching persona from the predetermined, discrete set of personas which has a generalized profile of personal and financial characteristics which best matches the personal and financial data of the user.

13. The system of claim 12, wherein the matching algorithm utilizes keyword matching based on semantic equivalence of words between the personal and financial data of the user and each of the personas.

14. An article of manufacture comprising a non-transitory computer readable medium embodying instructions executable by a computer to execute a process for providing personalized content in a website by a persona database system comprising a computer having at least one processor, the process comprising:

accessing personal and financial data of a user;

comparing the personal and financial data of the user with a predetermined, discrete set of personas wherein each persona identifies a different generalized profile of personal and financial characteristics associated with each respective persona, and determining a matching persona from the predetermined, discrete set of personas which has a generalized profile of personal and financial characteristics which best matches the personal and financial data of the user;

receiving a first request in relation to the user accessing a first website for a persona for the user, the first website hosted by a first website server, the first website requesting the persona in order to personalize website content to be delivered to the user; and sending the matching persona to the first website server.

15. The article of claim 14, wherein the process further comprises:

the persona database system receiving a second request in relation to the user accessing a second website, different from the first website, for a persona for the user, the second website hosted by a second website server, the second website requesting the persona in order to personalize website content to be delivered to the user; and the persona database system sending the matching persona to the second website server.

16. The article of claim 15, wherein the second website server is one of the same website server as the first website server or a different website server as the first website server.

17. The article of claim 14, wherein the persona database system accesses the personal and financial data of the user from a computerized tax return application.

18. The article of claim 14, wherein the persona database system accesses the personal and financial data of the user by providing an online questionnaire to the user and receiving responses to the online questionnaire from the user.

19. The article of claim 14, wherein the process further comprises:

the persona database system receiving credentials of the user from the first website server for accessing the persona of the user;

the persona database system verifying the credentials of the user; and upon verifying the credentials, the persona database system executing the step of sending the matching persona to the first website server.

20. The article of claim 14, wherein the persona database system receives the first request in relation to the user accessing the first website for a persona in response to the user selecting a command on the first website.

21. The article of claim 14, wherein the persona database system receives the first request in relation to the user accessing the first website for a persona from a browser plug-in installed in the user's internet browser.

22. The article of claim 14, wherein the first website is operated by a third party that is not the user or a provider of the persona database system.

23. The article of claim 14, wherein in the first website is a blog website and the website content comprises one or more articles distributed by the blog website.

24. The article of claim 14, wherein the first website is a commercial website selling products or services, and the website content is personalized to the user to display certain products or services sold on the website based on the matching persona for the user.

25. The article of claim 14, wherein the persona database system utilizes a matching algorithm to determine a matching persona from the predetermined, discrete set of personas which has a generalized profile of personal and financial characteristics which best matches the personal and financial data of the user.

26. The article of claim 25, wherein the matching algorithm utilizes keyword matching based on semantic equivalence of words between the personal and financial data of the user and each of the personas.

* * * * *